(12) United States Patent
Becerra et al.

(10) Patent No.: US 7,074,511 B2
(45) Date of Patent: *Jul. 11, 2006

(54) FUEL CONTAINER AND DELIVERY APPARATUS FOR A LIQUID FEED FUEL CELL SYSTEM

(75) Inventors: Juan J. Becerra, Voorheesville, NY (US); Michael S. DeFillipis, Niskayuna, NY (US)

(73) Assignee: The Gillette Company, Boston, MA (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/041,301

(22) Filed: Jan. 8, 2002

(65) Prior Publication Data

US 2003/0129464 A1  Jul. 10, 2003

(51) Int. Cl.
  *H01M 2/00* (2006.01)
  *H01M 8/04* (2006.01)
  *B65D 35/22* (2006.01)
  *B65D 77/00* (2006.01)
  *F16K 15/20* (2006.01)

(52) U.S. Cl. ............. 429/34; 429/25; 429/38; 206/218; 206/776; 222/94; 137/224

(58) Field of Classification Search ........... 429/25, 429/22, 17, 34, 38, 6, 30, 32; 222/94, 1, 222/81, 129; 206/218, 776, 522, 524.6; 137/206, 137/224, 225, 799, 99, 87.04
See application file for complete search history.

(56) References Cited

U.S. PATENT DOCUMENTS

| | | | |
|---|---|---|---|
| 4,673,624 A | 6/1987 | Hockaday | |
| 4,810,597 A | 3/1989 | Kumagai et al. | |
| 5,523,177 A | 6/1996 | Kosek et al. | |
| 5,573,866 A * | 11/1996 | Van Dine et al. | ............ 429/13 |
| 5,599,638 A | 2/1997 | Surampudi et al. | |
| 5,631,099 A | 5/1997 | Hockaday | |
| 5,723,228 A | 3/1998 | Okamoto | |
| 5,759,712 A | 6/1998 | Hockaday | |
| 5,766,786 A | 6/1998 | Fleck et al. | |
| 5,773,162 A * | 6/1998 | Surampudi et al. | ........... 429/39 |
| 5,795,668 A | 8/1998 | Banerjee | |
| 5,916,699 A | 6/1999 | Thomas et al. | |
| 5,945,231 A | 8/1999 | Narayanan et al. | |
| 5,992,008 A | 11/1999 | Kindler | |
| 6,460,733 B1 * | 10/2002 | Acker et al. | ................. 222/94 |
| 6,506,513 B1 | 1/2003 | Yonetsu et al. | |
| 2002/0197522 A1 | 12/2002 | Lawrence et al. | |
| 2003/0008193 A1 | 1/2003 | Kinkelaar et al. | |
| 2004/0072049 A1 * | 4/2004 | Becerra et al. | ............. 429/34 |

FOREIGN PATENT DOCUMENTS

EP  1274144 A2  8/2003

OTHER PUBLICATIONS

"Fuel Cell", 1992 Fuel Cell Seminar, Program and Abstracts, pp. 233-236, 461-464, Nov.-Dec. 1992.
"Miniaturized Fuel Cells for Portable Power", Helen L. Maynard and Jeremy P. Meyers, Lucent Technologies, Apr. 2000.
"Pocket-size PEMs", Paul Sharke, Mechanical Engineering, no date available.
"Polymer Electrolyte Fuel Cells as Potential Power Sources for Portable Electronic Devices", Shinshon Gottesfeld and Mahlon S. Wilson, pp. 487-517.
International Search Report for International Application No. PCT/US02/40826, International Filing Date: Dec. 20, 2002, all pages.

* cited by examiner

*Primary Examiner*—Raymond Alejandro
(74) *Attorney, Agent, or Firm*—Cesari and McKenna, LLP; Rita M. Rooney (57) ABSTRACT

A liquid feed fuel cell system having a unique fuel container and delivery assembly is provided. The container and delivery assembly allows liquid fuel which, in a preferred embodiment, is in the form of either pure methanol or an aqueous methanol/water mixture, to be placed under pressure so that it is delivered to the cell in a continuous manner. The fuel substance is stored in a flexible bladder that is housed in an outer container. The inner flexible bladder containing the fuel is fitted with a for supplying instrument that compresses the flexible bladder such that the fuel is expressed through a conduit in the container, to the direct oxidation fuel cell in a continuous manner. Other embodiments include the force-applying instrument being employed in a fuel cell system that includes inlet and outlet ports.

9 Claims, 9 Drawing Sheets

FUEL CONTAINER AND DELIVERY APPARATUS FOR A LIQUID FEED FUEL CELL SYSTEM

BACKGROUND OF THE INVENTION

1. Field of the Invention

The present invention relates generally to the field of liquid feed fuel cells, including direct oxidation fuel cells and, more particularly, to a fuel container and delivery apparatus for systems including such fuel cells.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy. Liquid feed fuel cells employ a liquid substance, such as methanol, as the fuel.

By way of background, fuel cell systems may be divided into "reformer-based" systems (i.e., those in which the fuel is processed in some fashion to extract hydrogen from the fuel before it is introduced into the fuel cell) or "direct oxidation" systems in which the fuel is fed directly into the cell without the need for separate internal processing. Most currently available fuel cells are reformer-based fuel cell systems. However, because fuel-processing is technically complex, difficult and requires significant volume, reformer based systems are presently limited to comparatively high power applications.

It should be understood that the fuel used in the cell may be either a carbonaceous liquid or a gas. A fuel cell that utilizes a liquid fuel is said to be a "liquid feed" fuel cell. A liquid feed fuel cell may be further categorized as a "liquid feed reformer-based fuel cell" or a "liquid feed direct oxidation fuel cell". In some instances, it may be desirable to store and utilize a liquid fuel, rather than a gaseous fuel, due to the ease of handling and storage of liquids, and comparative stability of a liquid under a wide range of environmental conditions. It should also be understood that this description is related primarily to liquid feed fuel cell systems, and as such the systems are categorized simply as direct oxidation or reformer-based systems.

In lower power operations, such as hand held portable electronics, it may be advantageous to utilize a direct oxidation fuel cell system. More specifically, direct oxidation fuel cell systems may be best suited for a number of applications in smaller mobile devices (e.g., mobile phones, handheld and laptop computers), as well as in some larger applications.

Briefly, in direct oxidation fuel cells, a carbonaceous liquid fuel (typically in an aqueous solution such as an aqueous methanol solution) is introduced to the anode face of a membrane electrode assembly (MEA). The MEA contains a protonically-conductive but, electronically non-conductive membrane (PCM). Typically, a catalyst, such as platinum or a platinum/ruthenium alloy, which enables direct oxidation of the fuel on the anode is disposed on the surface of the PCM (or is otherwise present in the anode chamber of the fuel cell). Protons (from hydrogen found in the fuel and water molecules found on the anodic face of the reaction) are separated from the electrons. The protons migrate through the PCM, which is impermeable to the electrons. The electrons thus seek a different path to reunite with the protons and oxygen molecules involved in the cathodic reaction. Accordingly, the electrons travel through a load, providing electrical power.

One example of a liquid feed fuel cell system is a direct oxidation fuel cell system, and more specifically, a direct methanol fuel cell system (or "DMFC" system). In a DMFC system, methanol in an aqueous solution is used as the liquid fuel (the "fuel mixture"), and oxygen, preferably from ambient air, is used as the oxidizing agent. There are two fundamental reactions that occur in a DMFC which allow a DMFC system to provide electricity to power-consuming devices: the anodic disassociation of the methanol and water fuel mixture into $CO_2$, protons, and electrons; and the cathodic combination of protons, electrons and oxygen into water.

In order for these reactions to proceed continuously, fuel cells, including liquid feed fuel cells, must be supplied with sufficient fuel to ensure power generation. Moreover, if such a liquid feed fuel cell is to be used with a portable, handheld device, it ideally should operate, effectively, in a variety of orientations. Accordingly, a DMFC, when used in a portable electronic device should include a fuel delivery system that delivers liquid fuel on either a continuous basis or upon demand, regardless of the orientation of the DMFC system.

Due to the nature of methanol, and its associated risks to persons and properties, safety precautions are typically followed when using this substance. It is thus desirable to store and deliver methanol in a manner that substantially prevents leakage of the fuel from the container. Furthermore, the fuel substance may be mixed with one or more additives that increase its detectability in case it does escape from its container. These safety enhancing additives allow for safer handling of the fuel substance by providing an odor and/or color to increase the likelihood of detection of the substance, by a person who may come in contact with it if amounts of methanol are released from the fuel cell, either upon disposal or accidental breakage.

For best results, the safety-enhancing additives should be stored and maintained separately from the fuel while the fuel is in use powering the relevant device. The device should also conform to a small form factor and these advantages should be provided at an expense level that allows mass manufacturing techniques to remain feasible. Accordingly, it is an object of the invention to provide a storage container and delivery system that feeds liquid fuel to a fuel cell in a continuous, or periodic manner, but without unexpected interruption even while the device (being powered by the fuel cell) is operated in a variety of orientations.

SUMMARY OF THE INVENTION

These and other advantages are provided by the present invention in which a fuel container and delivery assembly includes an inner flexible bladder containing fuel for a liquid feed fuel cell. The fuel container and delivery assembly is fitted with a pressure-applying element that exerts a continuous pressure upon the fuel-containing flexible bladder in such a manner that the fuel is expressed through a conduit in the container to the direct oxidation fuel cell. The fuel is supplied to the fuel cell in a continuous manner, or on demand. The fuel container may be a replaceable cartridge. The fuel container and delivery system of the present invention delivers fuel simply and inexpensively to the liquid feed fuel cell while it is being used in any orientation.

In one embodiment of the invention, the pressure-applying element includes a spring-loaded plate or other device that compresses the flexible bladder to apply pressure to the liquid fuel in such a manner that it is continuously available to the fuel cell. In accordance with another aspect of the invention, an expandable material such as expandable foam is applied to a plate to exert pressure upon the flexible bladder.

The pressure assembly may be housed within an outer container that defines a plenum within which safety-enhancing additives are contained. In the event that the fuel delivery assembly is compromised or when being discarded, the safety enhancing additives are mixed with the fuel to cause it to be detectable.

BRIEF DESCRIPTION OF THE DRAWINGS

The invention description below refers to the accompanying drawings, of which.

DETAILED DESCRIPTION OF AN ILLUSTRATIVE EMBODIMENT

The present invention is a fuel storage container and delivery assembly. The fuel may be any liquid carbonaceous fuel including, but not limited to, methanol, ethanol, propane and butane, or aqueous solutions thereof. For purposes of illustration, we herein describe an illustrative embodiment of the invention as it is employed in connection with a direct methanol fuel cell system ("DMFC"), with the fuel substance being methanol or an aqueous methanol solution. It should be understood, however, that it is within the scope of the present invention that the fuel container and delivery system can be readily used for other fuels to be stored and delivered to direct oxidation fuel cells. Thus, as used herein, the word "fuel" shall include methanol, ethanol, propane, butane or combinations thereof, and aqueous solutions thereof and other liquid carbonaceous fuels amenable to use in a direct oxidation fuel cell system.

Figure 1:
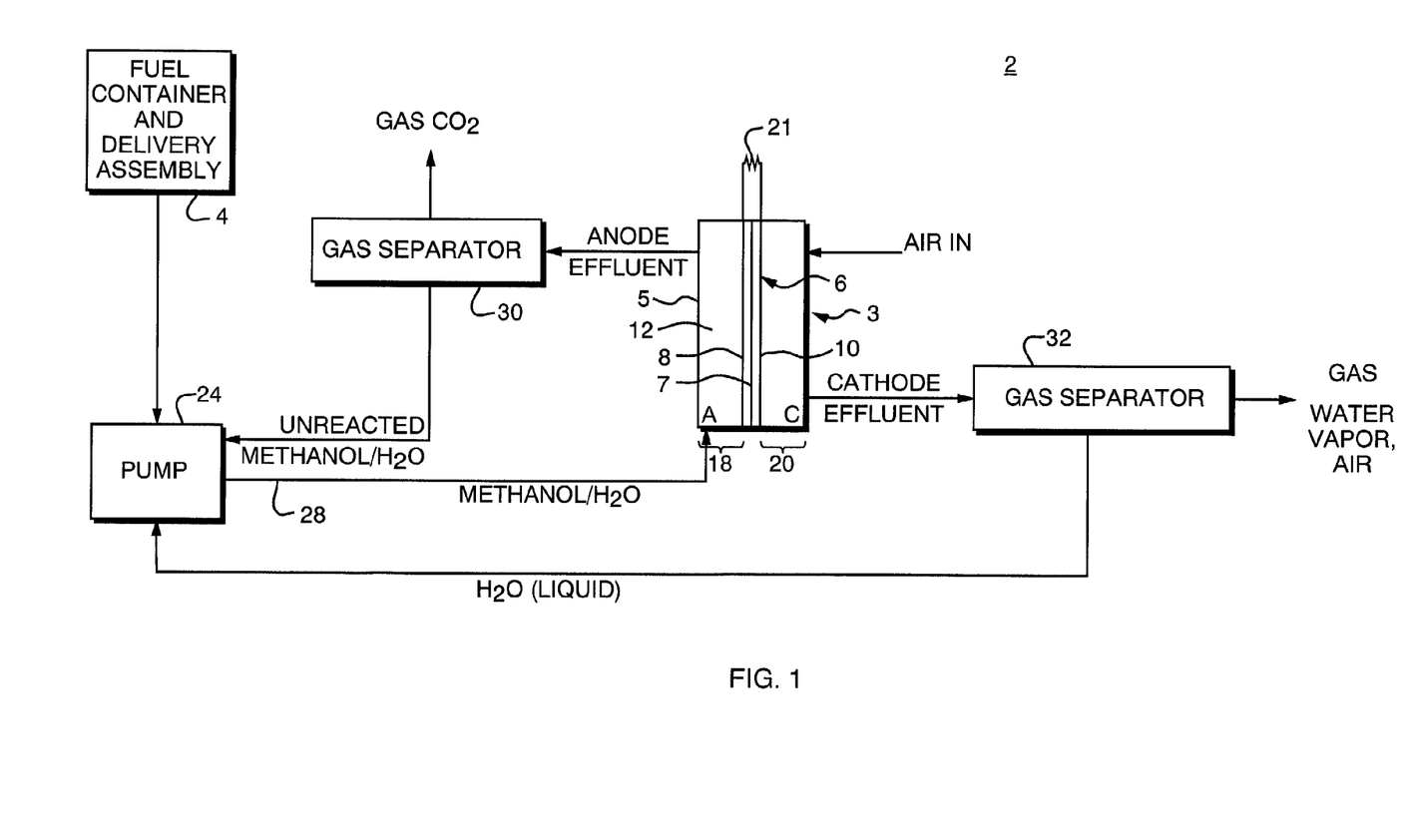
FIG. 1 is a block diagram of a direct methanol fuel cell system with which the present invention may be employed.

For a better understanding of the invention, a direct methanol fuel cell system with which the invention may be employed will be briefly described. FIG. 1 illustrates a direct methanol fuel system 2 with which the fuel container and delivery system of the present invention may be used. The system 2, including the DMFC 3, has a fuel delivery system to deliver fuel from fuel container and delivery assembly 4 in accordance with the invention. The DMFC 3 includes a housing 5 that encloses a membrane electrode assembly 6 (MEA). MEA 6 incorporates protonically conductive, electronically nonconductive membrane 7 (PCM). PCM 7 has an anode face 8 and cathode face 10, each of which may be coated with a catalyst, including but not limited to platinum or a platinum/ruthenium alloy. The portion of DMFC 3 defined by the housing 5 and the anode face of the PCM is referred to herein as the anode chamber 18. The portion of DMFC 3 defined by the housing 5 and the cathode face of the PCM is referred to herein as the cathode chamber 20. Additional elements of the direct methanol fuel cell system such as flow field plates, and diffusion layers (not shown in FIG. 1) to manage reactants and byproducts may be included within anode chamber 18 and cathode chamber 20.

Methanol or a solution of methanol and water are introduced into the anode chamber 18 of the DMFC 3, or into an internal fuel reservoir (not shown) from which the fuel solution will be delivered to the anode chamber 18. More specifically, as will be understood by those skilled in the art, electricity-generating reactions occur when a fuel substance is introduced to the anode face 8 of the PCM, and oxygen, typically in the form of ambient air, is introduced to the cathode face 10 of the PCM in the presence of a catalyst.

A carbonaceous fuel substance from fuel container and delivery assembly 4 of the present invention is delivered by optional pump 24 to the anode chamber 18 of the DMFC 3. The fuel mixture passes through channels in associated flow field plates and/or a diffusion layers (not shown), and is ultimately presented to the PCM. Catalysts on the membrane surface (or which are otherwise present on the membrane surface) oxidize the carbonaceous fuel on the catalyzed anode face 8 of the PCM, separating hydrogen protons and electrons from the fuel and water molecules of the fuel mixture. Upon the closing of a circuit, the protons pass through PCM 7, which is impermeable to the electrons. The electrons thus seek a different path to reunite with the protons, and travel through a load 21 of an external circuit, thus providing electrical power to the load. So long as the reactions continue, a current is maintained through the external circuit. Direct oxidation fuel cells produce water ($H_2O$) and carbon dioxide ($CO_2$) which is separated out by gas separator 30, and the un-reacted methanol and water are recirculated to the pump 24. The cathode effluent is sent to gas separator 32 and water is recirculated to the pump 24, if desired in a particular application. Those skilled in the art will recognize that the fuel container and delivery assembly of the present invention may also be used in systems with different architectures.

Figure 2:
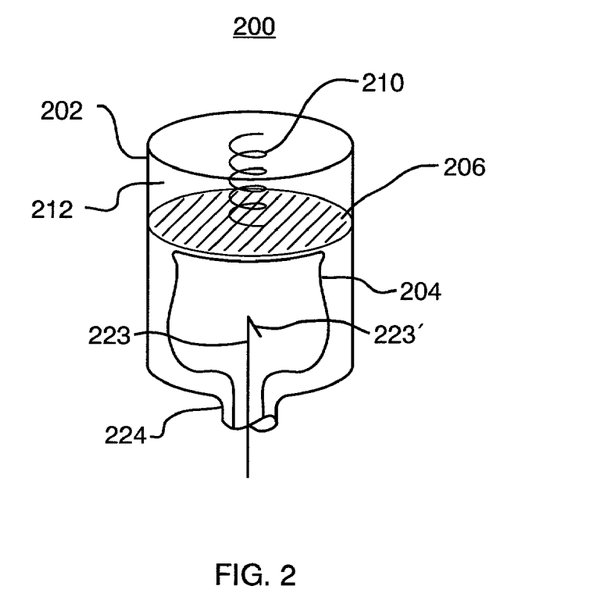
FIG. 2 is a schematic cross section of an embodiment of the fuel container and delivery assembly of the present invention in which the pressure-applying element is a spring.

FIG. 2 depicts one illustrative embodiment of the fuel container and delivery assembly of the present invention. The fuel container and delivery assembly 200, has an exterior housing that, in the illustrative embodiment shown, is a substantially rigid cartridge 202. Cartridge 202 encloses a collapsible fuel container 204, that may be a flexible bladder, which is used to hold the liquid fuel for a DMFC or other fuel cell with which it is associated. A plate 206 (which may be formulated from metal or an inert, rigid plastic material) is disposed in contact with or in close proximity to the flexible bladder 204. The plate 206 is placed under the force of spring 210. The spring 210 may be a coil spring, as shown in FIG. 2, or may be a "bow" type spring, while still remaining within the scope of the present invention. The choice of spring types may also depend upon the form factor and fuel delivery requirements of the system.

The plate 206 is, in the illustrative embodiment, of a shape having a perimeter that is substantially the same as the interior profile of the inner wall of the cartridge 202. This increases the likelihood that a maximum even pressure will be applied to the flexible bladder 204 because the plate will be stabilized within the cartridge to allow the maximum force of the spring to act at a right angle to the plate 206. The bladder is initially preferably full, containing substantially no air, or other gas. As the liquid fuel is consumed by the DMFC, the bladder with deflate and the compression spring extends to elongate and to continue to apply pressure on the bladder 206, to supply fuel in a substantially constant flow to the DMFC.

Figure 3:
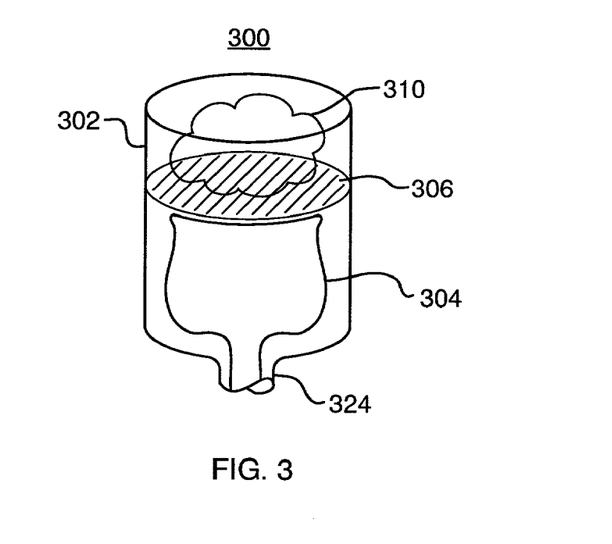
FIG. 3 is a schematic cross section of one embodiment of the fuel container and delivery assembly of the present invention in which the pressure-applying element is an expandable material.

An alternative embodiment is shown in FIG. 3. A cartridge 302, includes a flexible bladder 304 which has a plate 306 disposed next to it. An expandable material 310, which may be an elastomer or an expandable foam is disposed within the container contiguous to the plate 306, instead of a spring, to exert pressure upon the plate 306 which in turn, applies force to the bladder 304. In either the embodiment of FIG. 2 or FIG. 3, the pressure-applying element, i.e., either the spring or the expandable material, applies sufficient force to the bladder to compress it, thus increasing the pressure within the bladder to force fluid to flow out of it, but without rupturing the bladder. The specific pressures will depend upon the application in which the invention is to be employed and the materials used, for example.

A conduit 224 (FIG. 2) and conduit 324 (FIG. 3) provide for the flow of fuel to the DMFC. In accordance with one illustrative example, the conduit 224 of cartridge 202 is sealed with a seal or plug (not shown). A needle 223 may be used to puncture the seal as well as the flexible bladder 204 in order to draw fuel out of the bladder into the DMFC. The needle 223 can include a rupture component 223' to allow for a tear in the bladder when the container is to be disposed of. This allows mixing of additives, as previously discussed. Details of this aspect of the disclosure are described in commonly-owned U.S. Pat. No. 6,460,733, issued on Oct. 8, 2002 entitled MULTIPLE-WALLED FUEL CONTAINER AND DELIVERY SYSTEM, which is incorporated by reference herein in its entirety.

A valve located in either the container or within the DMFC system may be desirable for controlling the flow of fuel as will be understood by those skilled in the art. It may be further desirable to shape the external tank as shown in FIGS. 5A and 5B with sloped sides 520 in order to funnel fuel into the DMFC.

Figure 4:
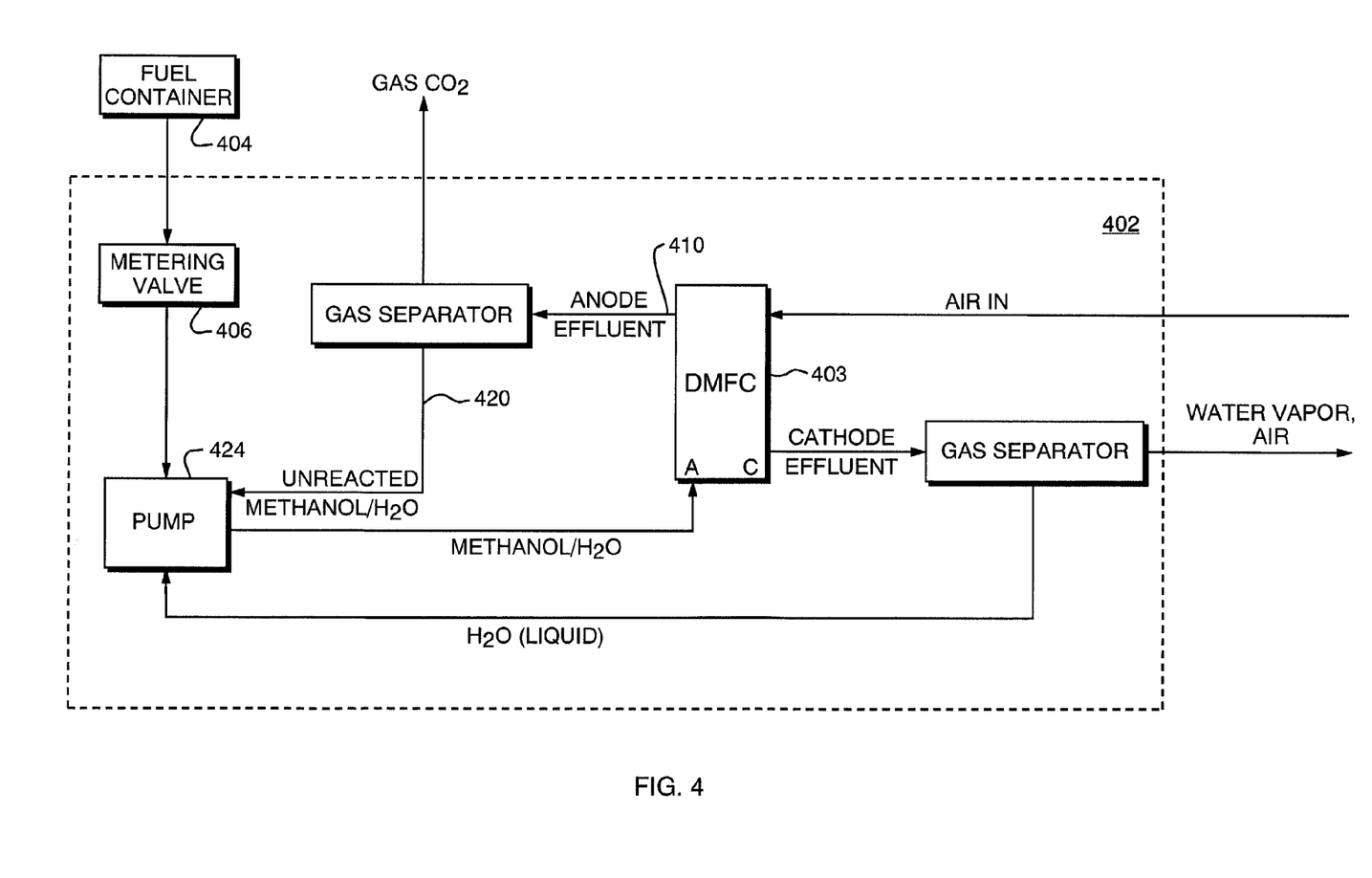
FIG. 4 is a block diagram of a direct methanol fuel cell system similar to that shown in FIG. 1 which also includes a metering valve to control the flow of fuel into the DMFC.

The valve may be a metering valve as illustrated in FIG. 4. FIG. 4 depicts a direct methanol fuel cell system 402 that includes DMFC 403 that has fuel supplied to it from a fuel container and delivery assembly of the present invention 404. In this embodiment of the invention, the DMFC system 402 includes a metering valve 406. The metering valve 406 is actuated by a control system operated in accordance with an instruction set which may be executed by an associated microprocessor or other control logic.

The fuel is released from the fuel container and delivery assembly 404, through the metering valve 406, and released to a pump 424, an internal reservoir or mixing chamber (not shown), into the anode chamber of the DMFC 403. Changes in the concentration of the methanol solution used as the fuel may be made based upon the information determined from un-reacted methanol received via anode recirculation loop 410, 420, or from information based upon other operating parameters within the fuel cell system. By regulating the concentration of the methanol solution, the problems related to methanol cross over and water carryover typically addressed in any DMFC, can be controlled, and the DMFC system may be able to provide power over a wider power demand profile.

Figure 5A:
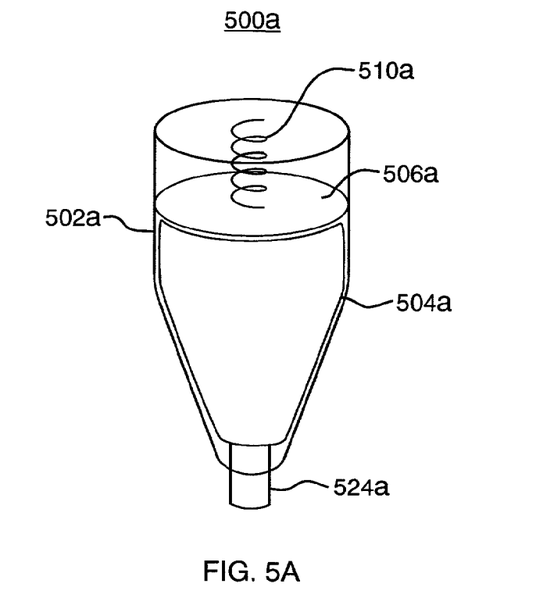
FIG. 5A is a schematic cross section of an embodiment of the fuel container and delivery assembly of the present invention, which has a funnel shape.
Figure 5B:
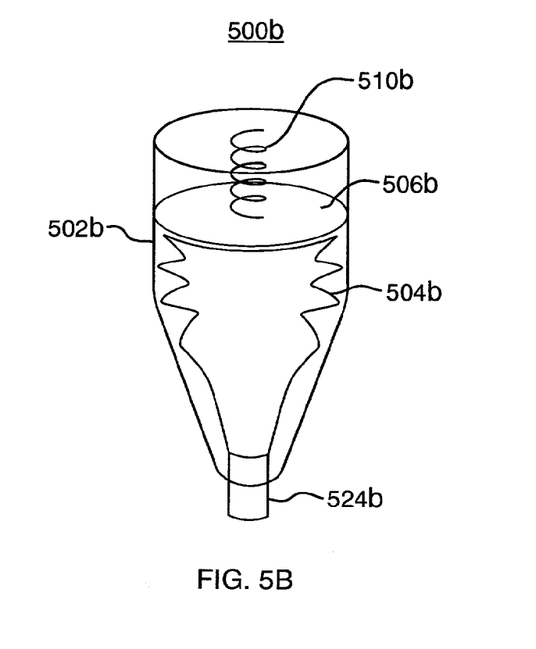
FIG. 5B is a schematic cross section of the embodiment of FIG. 5A in which the fuel container and delivery assembly includes a bellows type flexible bladder.

Two additional embodiments of the fuel container and delivery assembly of the present invention are illustrated in FIGS. 5A and 5B, respectively. In FIG. 5A, the fuel container and delivery assembly 500a includes fuel cartridge 502a. The fuel cartridge 502a has a fuel containing semi-rigid bladder, or envelope, 504a. In the embodiment illustrated, the bladder may be constructed of two sheets of bladder material that are bonded together, creating an envelope in which the fuel is stored. The envelope tends to collapse as fuel is consumed. The bladder is placed under pressure by plate 506a and spring 510a. In addition in the embodiment illustrated in FIG. 5A, it is preferred to fabricate the bladder in such a manner that it has a funnel shape. In this manner, the methanol is funneled towards a narrower end proximate to the conduit 524a at the interface between the fuel container 500a and the system components leading to the anode side of the fuel cell.

In FIG. 5B, a fuel container and delivery assembly 500b has a cartridge 502b that houses a bladder 504b that has a bellows configuration. The bellows-type bladder is selectively collapsible which avoids portions of a partially collapsed bag from blocking the flow of methanol, as fuel is consumed in the operation of the relevant device. As in the other embodiments described, a plate 506b is acted upon by a spring 510b to compress the bellows-shaped bladder 504b.

Figure 6:
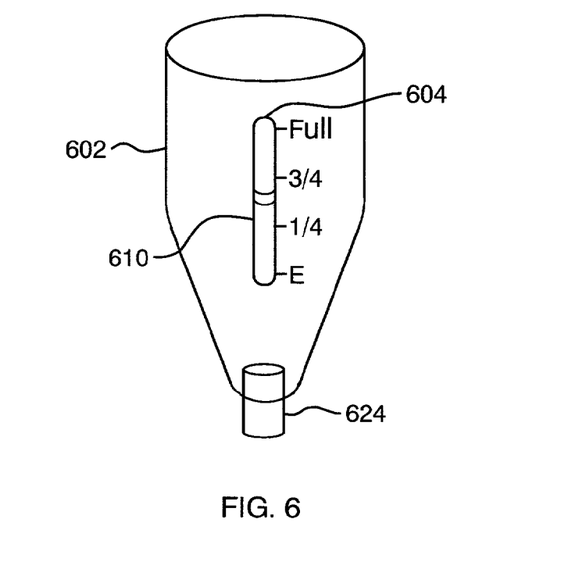
FIG. 6 is a schematic illustration of one embodiment of the fuel container and delivery assembly of the present invention that includes a fuel gauge.

The invention also provides for a simple and accurate fuel gauge to be included in the fuel container and delivery assembly. As shown in FIG. 6, the fuel container and delivery assembly 600 has an outer container 602, that includes a fuel gauge 604 which may be a transparent window, that provide a visual indication of the amount of fuel in the assembly 600. The cartridge 602 includes a bladder (not visible in FIG. 6) which, as it is deflated as fuel is consumed, allows the colored plate to move towards the conduit 624 (and visibly through the window of gauge 604) towards one end of the assembly.

The gauge can be readily calibrated. As the spring elongates, fuel is being consumed, and the plate moves towards the conduit end of the assembly. It may be that a portion of the cartridge 602 could be cutaway, and a clear material placed in the resulting opening, so that the plate (which can be made more visible using coloring and markings) can serve as the gauge. The window 610 of FIG. 6 illustrates this embodiment, and in the illustration, the fuel cartridge is indicated to be between one half and three quarters full.

Figure 7:
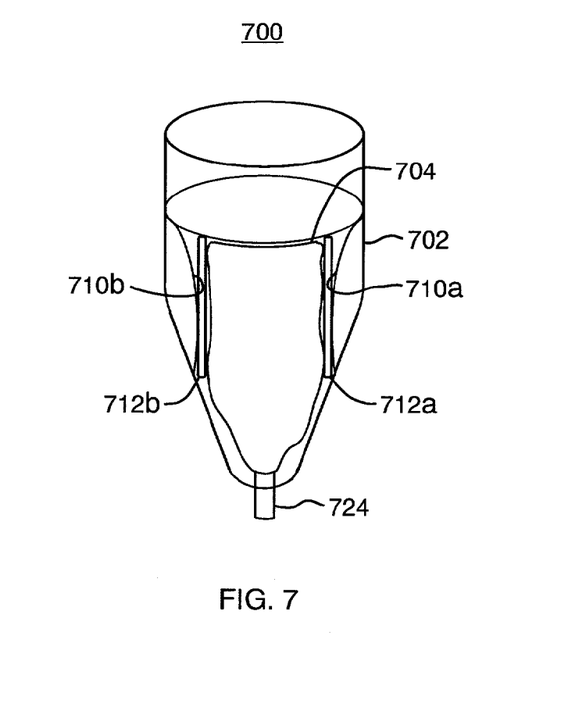
FIG. 7 is a schematic cross section of one embodiment of the fuel container and delivery assembly that includes axially placed pressure-applying elements.

In accordance with another aspect of the invention, the pressure-applying element may be a combination of axial components, such as the elements 710a and 710b in the assembly 700 of FIG. 7. In this embodiment, the cartridge 702 includes bladder 704. The elements 710a and 710b are bow-type springs that act upon plates 712a and 712b, respectively. The plates 712a and 712b compress the bladder 704. Other types of springs, or other elements can be selected for the materials (such as the expandable materials mentioned hereinbefore) for elements 710a and 710b while remaining within the scope of the present invention. This embodiment of the invention may be preferable in certain applications in order to comply with certain form factors where a narrower device is involved, or in circumstances in which a different pressure is desired.

Figure 8A:
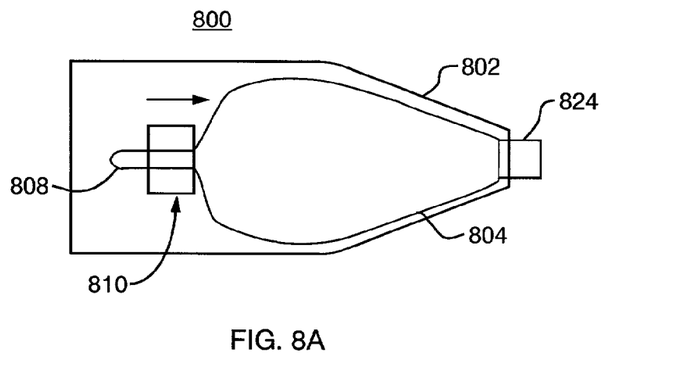
FIG. 8A is a schematic cross section of one embodiment of the fuel container and delivery assembly that includes a constant force spring and displacement sub-assembly.
Figure 8B:
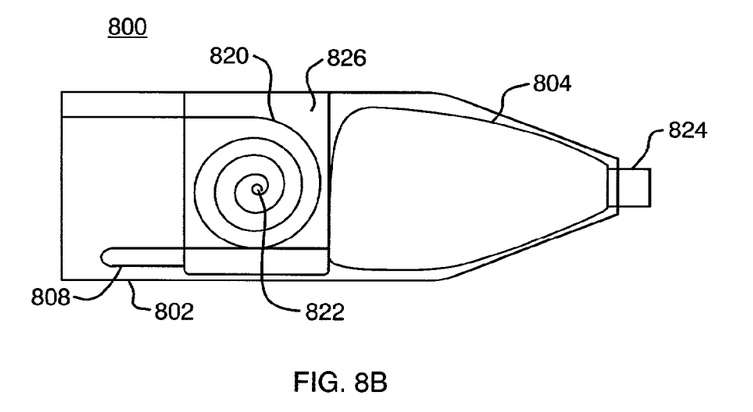
FIG. 8B is a top plan view of the device of FIG. 8A.

FIGS. 8A and 8B illustrate a fuel container and delivery assembly 800 having a cartridge 802 that includes a bladder 804. The bladder 804 is crimped at one end 808 with a displacement sub-assembly 810. The displacement sub-assembly 810 includes a constant force spring 820 that is wound around an axle 822. The axle 822 moves along a guide to force a compression element 826 against the bladder 804 to force liquid fuel out of the conduit 824. As fuel is released from the bladder, the displacement assembly allows that portion of the bladder, which no longer contains fuel 808 to pass through an opening in the compression element 826 (or next to it). Thus, a portion of the bladder that contains fuel is maintained under pressure.

A second aspect of this embodiment of the invention includes a compression spring as the spring 820 (FIG. 8B). The axle and the bladder are mechanically integrated or coupled so that the spring causes the axle to rotate, minimizing the volume of the bladder. As fuel is release through conduit 824, the axle continues to rotate, and applies pressure to the bladder 804 causing fuel to be released when an associated valve is opened.

Figure 9:
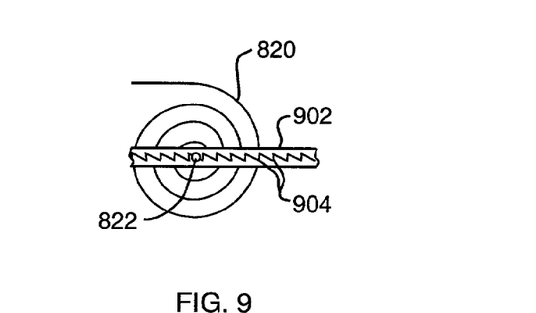
FIG. 9 is a top plan view of one embodiment of a pressure-applying element in accordance with the invention, including a locking system.

A locking system can be included in the displacement subassembly, as illustrated in FIG. 9. In accordance with this aspect of the invention, the axle 822, under the action of the constant force spring 820 moves along a guide 902 that has a serrated track that includes ratcheting teeth 904. The axle 822 fits within the ratcheting teeth 904, and can move forward along the guide 902, but not backwards in the opposite direction. This locking system resists the displacement assembly from slipping back, thus preventing loss of pressure and flow of fuel to the fuel cell.

Alternatively, a cartridge implementing a locking system may be used to prevent the undesired flow of fuel. In this alternate system illustrated in FIGS. 10A and 10B, a cartridge 1000 with a rigid wall 1001 contains a fuel bladder 1008, which is fastened or otherwise mechanically integrated to a roller 1010. The roller is fastened to an axle 1012 which is also fastened to two transport restriction components 1014a, 1014b. (FIG. 10B) Attached to the axle is a coil spring 1003, which is also attached to one transport restriction component (1014a). The torsional action of the coil spring 1003 (FIG. 10C) pulls the assembly forward, compressing the bladder and decreasing its volume as fuel is delivered into the system. The pressure applied as the result of the torsional action of the coil spring can be adjusted by calibrating the spring constant of the coil spring such that it applies enough pressure to ensure that fuel is delivered to the fuel cell system, but does not exceed the valve blocking pressure. Attached to the face of one of the transport restriction components is a helical spring 1014a, which is fastened to the interior aspect of the rigid wall. Collectively, the roller, axle, helical spring and transport restriction components are referred to as the roller assembly 1016. The roller assembly is positioned in the cartridge, with the axle either extending through the cartridge, or resting in a groove that is accessible through the exterior wall.

Figure 10A:
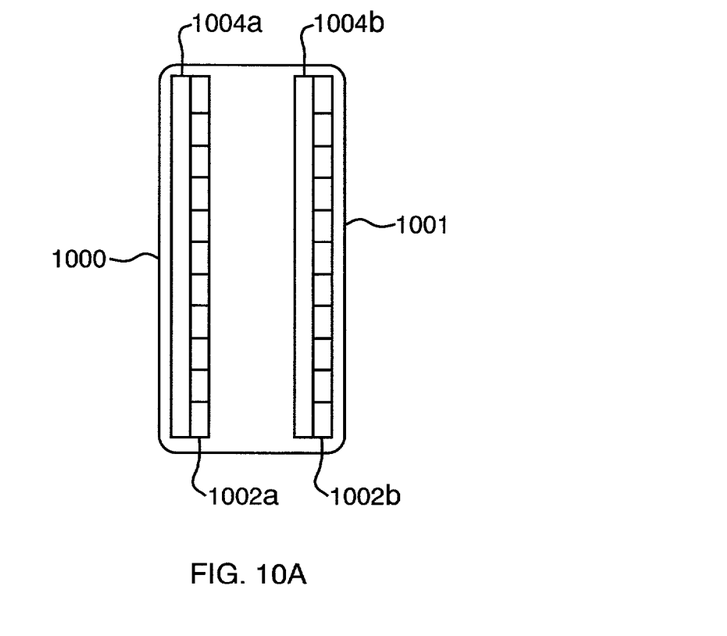
FIG. 10A is a top plan section of a fuel cartridge of one embodiment of the invention having tracks upon which a fuel bladder and associated roller can travel as fuel is consumed.
Figure 10B:
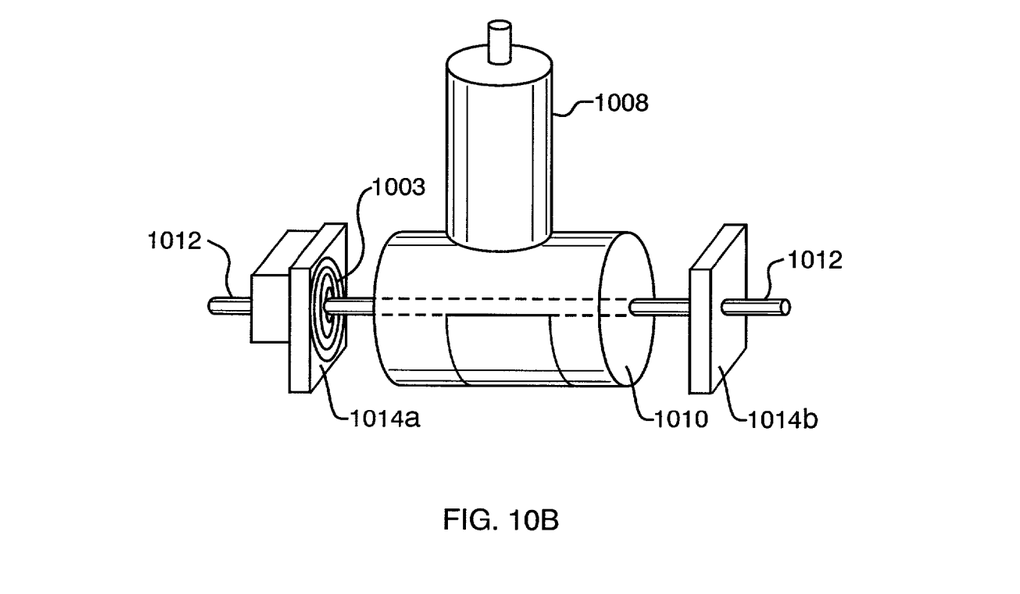
FIG. 10B is a schematic top plan view of the fuel bladder and roller assembly that travels along the track illustrated in FIG. 10A.
Figure 10C:
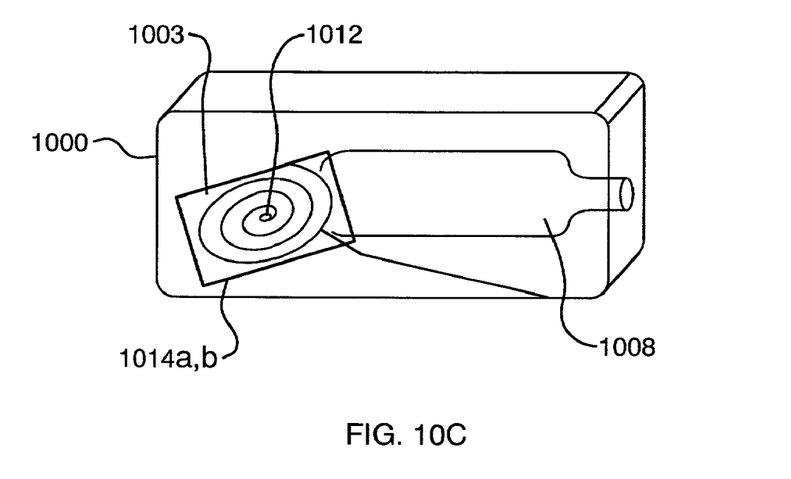
FIG. 10C is a side section of one embodiment of the fuel container and delivery assembly of the present invention wherein the pressure-applying element is a coil spring.
Figure 10D:
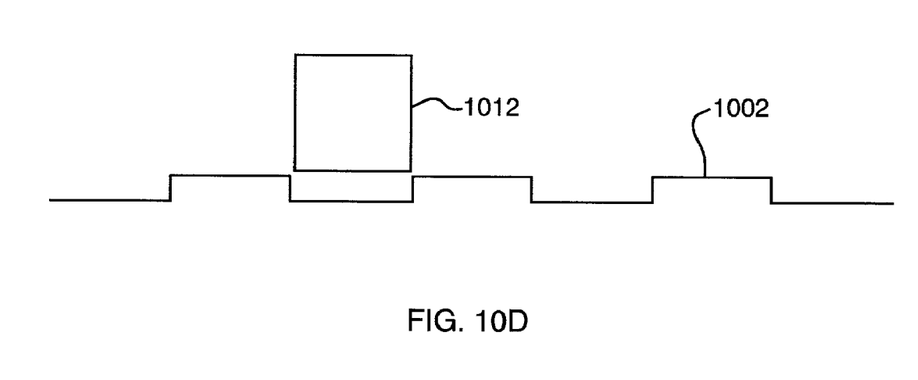
FIG. 10D is a schematic side section of a toothed track as used in the assembly of FIG. 10B.

As illustrated in FIG. 10A, integrated or mechanically attached to the interior aspect of the cartridge are two sets of tracks, each of which consists of a smooth track 1004a,b and a toothed track 1002a,b. When the cartridge is outside of the DMFC system, the helical spring is extended and presses the roller assembly into the toothed track. When force is applied to the long axis of the axle, the roller assembly is shifted onto the smooth track, where it can be moved forward by the coil spring, thus applying pressure to the fuel bladder as the spring extends and decreases the volume of the fuel bladder, inducing flow when the associated valve is opened. When force is released, the roller will be pressed back into the toothed track, where it will be locked in place (FIG. 10D).

Force may be applied via a the insertion process wherein pressure is applied to the axle by pressing the cartridge into a specially designed opening integrated into the appliance that applies pressure to the axle, thus pushing the transport restriction component onto the smooth track. When the cartridge is removed from the appliance, pressure ceases to be exerted onto the axle, thus allowing the helical spring to push the roller assembly into the toothed track, and preventing it from moving forward. Those skilled in the art will recognize that the functions of the springs may be integrated into a single component, or that it may be necessary to use additional springs, depending on the volume of fuel required to be moved and the form factors.

Figure 11:
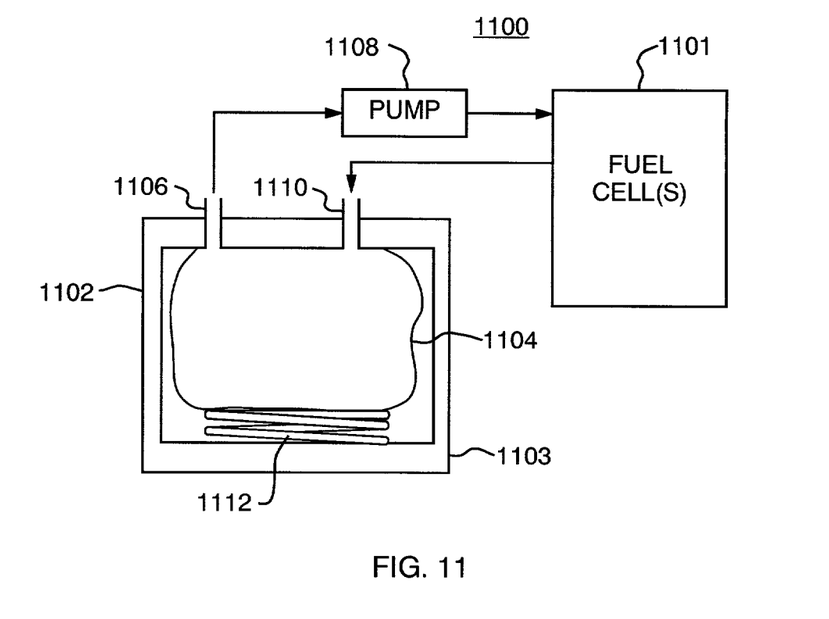
FIG. 11 is a schematic cross section of one embodiment of the fuel container and delivery assembly of the present invention incorporating a disposable fuel cartridge having a fuel recirculation feature.

Another aspect of the invention is illustrated in FIG. 11. FIG. 11 depicts part of a fuel cell system 1100 which has a fuel cell 1101 supplied by a fuel container and delivery assembly 1102. The fuel container and delivery assembly has an outer rigid shell 1103 that houses an inner cartridge 1104. The inner cartridge 1104 encloses a collapsible bag, or flexible bladder 1105, which contains the aqueous fuel solution. As the volume of fuel decreases with fuel consumption, the collapsible bag 1105 accommodates the change in volume. In this embodiment of the invention, the inner cartridge 1104 is replaceable. The replaceable cartridge 1104 has a fuel outlet conduit (also referred to herein as a fuel exit port) 1106 through which fuel is directed to an optional pump 1108, to the fuel cell 1101. In addition, the replaceable fuel cartridge 1104 has a fuel return port 1110 to enable the recirculation of unused fuel back into the fuel container 1102. This configuration enables a relatively low concentration of methanol to be utilized. Once the methanol concentration falls below a useful level, and the useable fuel is consumed, the cartridge can be removed and disposed of.

In accordance with an alternative aspect of the invention, the embodiment illustrated in FIG. 11 may include a spring 1112 (or other pressure-applying element such as an expandable foam) to place the fuel under pressure in such a manner that an initial charge of fuel can be delivered to the fuel cell without the need of the pump 1108. In addition, this initial charge may be used to prime the pump and thus eliminate the need to store the electrical energy needed for the initial pump operation. Once the system is full of fuel, the electrical energy needed to start the pump can be produced by the fuel cell.

Figure 12:
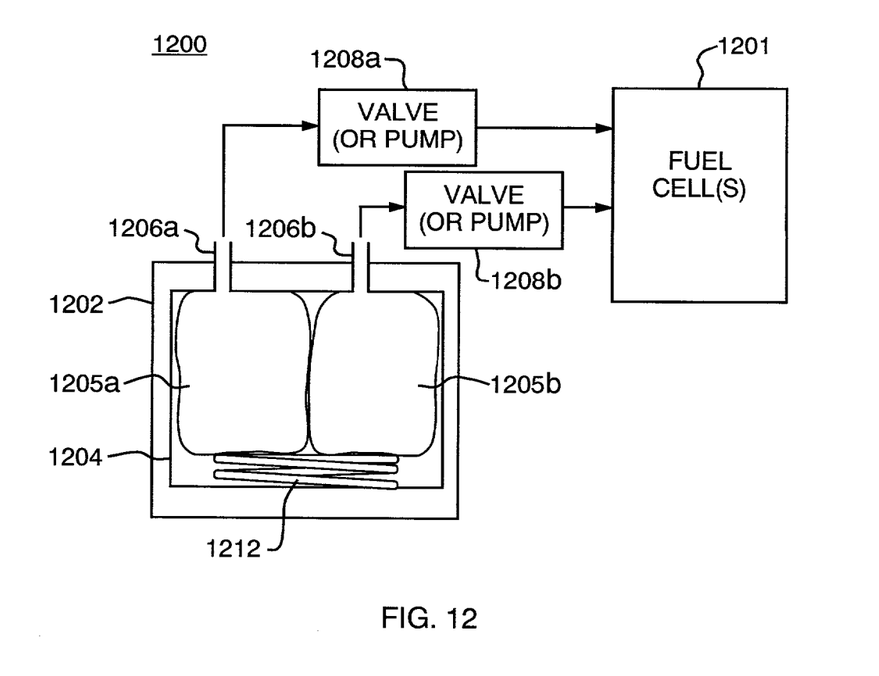
FIG. 12 is a schematic cross section of one embodiment of the fuel container and delivery assembly in which a dual bladder sub-assembly provides a high concentration fuel and a low concentration fuel.

FIG. 12 depicts an alternative embodiment in which a fuel cell system 1200, has a fuel cell 1201 (or a plurality of fuel cells) that is supplied with fuel from fuel container and delivery assembly 1202. In this embodiment, the fuel container and delivery assembly includes a disposable container 1204 that encloses dual fuel bladders (or bags) 1205a and 1205b. This enables delivery of different fuel concentrations to the fuel cell 1201. More specifically, a high methanol concentration fuel may be delivered from container 1205a, via fuel outlet 1206a, through an optional pump 1208a. A lower methanol concentration fuel may be delivered from container 1205b, via the fuel outlet 1206b, through an optional pump 1208b. The fuel concentration can be controlled by switching between high and lower concentration fuels. The carbon dioxide gas may be vented at the anode. A feedback mechanism can be used to control the valve operation depending upon a selected parameter, such as cell temperature, methanol concentration and the like.

If desired, in an alternative embodiment, the collapsible bags 1205a and 1205b may be slightly pressurized by a spring, such as the spring 1212, or a gas or compliant, expandable material such as foam. Similar to the embodiment of FIG. 11, the pressure could be used to provide an initial charge of fuel, to allow for start up of the cell.

It should be understood that the concepts described with respect to each of the embodiments may be interchanged and varied while remaining within the scope of the present invention. Furthermore, it may be beneficial in certain circumstances to fabricate the pressure applying elements so that the pressure is increased, or decreased, as the fuel is consumed, depending upon the particular application. This may be accomplished by selecting different types of materials. The parameters may also be varied depending upon the form of the spring that is selected. In addition, while the illustrative embodiments have employed compression springs that exert force away from the center of the spring, extension springs that pull force towards the center of the spring may be employed and the invention is readily adaptable to incorporate such selections.

It is possible to store safety-enhancing additives that add color, odor and flavor to the fuel, or other fluids, as desired in the plenum 212 that is defined between the cartridge 202 and the bladder 204 (FIG. 2). Details of the storage of these substances in this manner were set forth in U.S. Pat. No. 6,460,733, issued on Oct. 8, 2002 entitled MULTIPLE-WALLED FUEL CONTAINER AND DELIVERY SYSTEM, previously incorporated by reference herein. As described therein, the container may also include a rupture component associated with the bladder such that the rupture component causes a tear in the bladder such that said fuel is mixed with the additives upon rupture of the flexible bladder.

As stated, it should also be understood that the present invention can also be readily employed with fuels other than methanol or methanol/water mixtures.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A liquid feed fuel cell system comprising:
   (A) a direct oxidation fuel cell including a membrane electrode assembly;
   (B) a source of fuel; and
   (C) a fuel container coupled with said fuel source and including:
      (i) an inner flexible bladder that is substantially fully expanded upon being filled with fuel from said fuel source, and having a conduit that is coupled to said membrane electrode assembly to supply fuel to said membrane electrode assembly;
      (ii) a force applying instrument that acts upon said bladder to compress the bladder such that the fuel contained in said bladder is expressed through said conduit towards said membrane electrode assembly; and
      (iii) a fuel gauge including a transparent window in said container, and a visual indicator integrated into said container, and a calibration scale on an outer wall of said container, in such a manner that as said flexible bladder moves towards said conduit when fuel is consumed from said bladder, a visual indication of fuel volume is provided.

2. A liquid feed fuel cell system for use with an associated direct oxidation fuel cell and a fuel source, the system comprising:
   (A) an inner flexible bladder that is substantially fully expanded upon being filled with fuel from said fuel source, and having a conduit that is coupled to a membrane electrode assembly of the direct oxidation fuel cell, to supply fuel to said membrane electrode assembly;
   (B) a displacement assembly including at least one displacement component coupled to said flexible bladder, and at least one force applying instrument acting upon said displacement component in such a manner that the displacement component compresses the bladder such that fuel contained in said bladder is expressed through said conduit towards said membrane electrode assembly; and
   (C) a fuel container that includes two opposed tracks, a first track being a set of smooth guides and a second track being a set of transport restriction components, and said displacement assembly includes an axle with two opposed units sized to fit within the teeth of said transport restriction component said displacement component disposed upon said axle and having said units on either side thereof whereby said displacement component rolls along said flexible bladder to compress the bladder as fuel is consumed and as said displacement component, being a roller, is moved along said bladder it is capable of being locked in position when said units are placed within said recesses of said transport restriction component.

3. The liquid feed fuel cell system as defined in claim 2, wherein said displacement component also includes a torsion spring wound around said axle whereby the pressure of said spring causes said displacement component to move and to compress said bladder whereby fuel is expressed through said conduit toward said membrane electrode assembly as fuel is consumed by the fuel cell.

4. A liquid feed fuel cell system comprising:
   (A) a direct oxidation fuel cell including a membrane electrode assembly;
   (B) a source of liquid fuel; and
   (C) a fuel container including an outer rigid shell that houses a plurality of collapsible bags which contain liquid fuel in varying concentrations, said fuel container being coupled with said fuel cell, and said collapsible bags are substantially fully expanded upon being filled with said liquid fuel in varying concentrations, and said container having a fuel outlet conduit to supply liquid fuel to said direct oxidation fuel cell and a fuel inlet through which fuel not consumed by said fuel cell is recirculated into said fuel container.

5. The liquid feed fuel cell system as defined in claim 4, wherein said outer rigid shell contains a first collapsible bag containing a high methanol concentration fuel substance and a second collapsible containing a low methanol concentration fuel substance.

6. The liquid feed fuel cell system as defined in claim 5, further comprising at least one force applying instrument disposed within said outer rigid shell such that fuel is expressed through said conduit toward said fuel cell.

7. The liquid feed fuel cell system as defined in claim 6, further comprising a first valve coupled with a fuel outlet conduit associated with said high methanol concentration fuel substance, the operation of which controls the delivery of said high methanol concentration fuel substance to said fuel cell, and a second valve coupled with a fuel outlet conduit associated with said low concentration fuel substance, the operation of which controls the delivery of said low concentration fuel substance to said fuel cell.

8. The liquid feed fuel cell system as defined in claim 7, further comprising:
 at least one force applying instrument acting upon said collapsible bags such that the bags are compressed such that fuel contained in said bags is expressed through the associated conduit toward said direct oxidation fuel cell.

9. The liquid feed fuel cell system as defined in claim 6 wherein said force applying instrument includes one or more deformable elements.

* * * * *